(12) United States Patent
Leeming et al.

(10) Patent No.: US 11,391,148 B2
(45) Date of Patent: Jul. 19, 2022

(54) CUTTING ASSEMBLY

(71) Applicant: ELEMENT SIX (UK) LIMITED, Didcot (GB)

(72) Inventors: Matthew John Ian Leeming, Didcot (GB); Valentine Kanyanta, Didcot (GB); Habib Saridikmen, Didcot (GB)

(73) Assignee: Element Six (UK) Limited, Didcot (GB)

( * ) Notice: Subject to any disclaimer, the term of this patent is extended or adjusted under 35 U.S.C. 154(b) by 0 days.

(21) Appl. No.: 16/982,950

(22) PCT Filed: Mar. 21, 2019

(86) PCT No.: PCT/EP2019/057143
§ 371 (c)(1),
(2) Date: Sep. 21, 2020

(87) PCT Pub. No.: WO2019/180169
PCT Pub. Date: Sep. 26, 2019

(65) Prior Publication Data
US 2021/0010371 A1 Jan. 14, 2021

(30) Foreign Application Priority Data
Mar. 23, 2018 (GB) ..................... 1804696

(51) Int. Cl.
*E21C 35/18* (2006.01)
*E21C 25/16* (2006.01)
(Continued)

(52) U.S. Cl.
CPC .......... *E21C 25/16* (2013.01); *E21C 35/1837* (2020.05); *B23D 61/04* (2013.01); *E21C 25/18* (2013.01); *E21C 35/19* (2013.01)

(58) Field of Classification Search
CPC ....... E21C 25/16; E21C 25/18; E21C 35/1837
See application file for complete search history.

(56) References Cited

U.S. PATENT DOCUMENTS 3,751,114 A * 8/1973 Davis .................. E21C 35/183
                                                    299/85.2
4,216,832 A   8/1980 Stephenson et al.
(Continued)

FOREIGN PATENT DOCUMENTS

EA    016278 B1    3/2012
GB    205529 A     10/1923
(Continued)

OTHER PUBLICATIONS

United Kingdom Patent Application No. GB1804696.1, Combined Search and Examination Report dated Aug. 31, 2018, 9 pages.
(Continued)

*Primary Examiner* — Janine M Kreck
(74) *Attorney, Agent, or Firm* — Kilpatrick Townsend & Stockton LLP

(57) ABSTRACT

This disclosure relates to a cutting assembly for mining or extraction. The cutting assembly comprises a circular disk cutter (18). Cutting elements are arranged around a circumferential surface of the disk cutter, each seated in a tool holder (24). The orientation of the seat is such that the cutting element (22) points tangentially in or towards the intended direction of rotation.

11 Claims, 4 Drawing Sheets

(51) Int. Cl.
*E21C 35/183* (2006.01)
*B23D 61/04* (2006.01)
*E21C 35/19* (2006.01)
*E21C 25/18* (2006.01)

(56) References Cited

U.S. PATENT DOCUMENTS

| | | | | |
|---|---|---|---|---|
| 4,755,004 | A * | 7/1988 | Palmquist | B28D 1/122 |
| | | | | 299/106 |
| 6,213,931 | B1 * | 4/2001 | Twardowski | A01G 23/067 |
| | | | | 125/3 |
| 8,753,755 | B2 | 6/2014 | Konyashin et al. | |
| 8,846,207 | B2 | 9/2014 | Konyashin et al. | |
| 8,968,834 | B2 | 3/2015 | Konyashin et al. | |
| 10,124,509 | B2 * | 11/2018 | Runquist | E02F 3/241 |
| 2003/0041482 | A1 | 3/2003 | Bechem et al. | |
| 2003/0234569 | A1 | 12/2003 | Dawood | |
| 2008/0149224 | A1 | 6/2008 | Kappel et al. | |
| 2009/0302668 | A1 | 12/2009 | Stratti | |
| 2013/0145657 | A1 * | 6/2013 | Ruhl | E02F 3/183 |
| | | | | 37/94 |
| 2015/0020418 | A1 * | 1/2015 | Clift | B28D 1/22 |
| | | | | 37/94 |

FOREIGN PATENT DOCUMENTS

| | | |
|---|---|---|
| GB | 2514884 A | 12/2014 |
| JP | 2004505189 A | 2/2004 |
| RU | 156374 U1 | 11/2015 |
| RU | 2580342 C | 4/2016 |
| SU | 727846 A2 | 4/1980 |
| SU | 1375144 A3 | 2/1988 |
| WO | 2010050872 A1 | 5/2010 |
| WO | 0188322 A1 | 11/2011 |
| WO | 2013092346 A2 | 6/2013 |
| WO | 2014049162 A2 | 4/2014 |

OTHER PUBLICATIONS

United Kingdom Patent Application No. GB1903893.4, Combined Search and Examination Report dated Jul. 8, 2019, 7 pages.
International Patent Application No. PCT/EP2019/057143, International Search Report and Written Opinion dated Jun. 18, 2019, 12 pages.

* cited by examiner

CUTTING ASSEMBLY

FIELD OF THE INVENTION

The present disclosure relates to mining and excavation machines. In particular, it relates to a cutting assembly for a rock excavation machine.

BACKGROUND

Many types of rock formations are available around the world as large deposits, commonly known as slabs. Various types of mining equipment are deployed in above ground quarries in order to extract the slabs from the ground. The slabs are retrieved using specialist equipment, typically dragged from their resting place by large and very powerful vehicles. Rock slabs may weigh up to 40 tons (40,000 kg). Processing, such as polishing, may take place on site, or alternatively the slabs may be transported off site for cutting into appropriately sized pieces for domestic and industrial use.

The same equipment used above ground may not always be directly usable within the confined space of a subterranean mine.

It is an object of the invention to provide a compact and versatile cutting assembly to facilitate the mining and extraction of geometrically or non-geometrically shaped blocks of specific rock formations, and one that may be used above or below ground.

SUMMARY OF THE INVENTION

According to the invention, there is provided a cutting assembly for a rock excavation machine comprising: a base unit, one or more moveable support arms extending from the base unit, a drive spindle rotatably mounted to the or each moveable support arm, a disk cutter fixed about the drive spindle such that rotation of the drive spindle causes a corresponding rotation of the disk cutter, the disk cutter comprising a cutter body, a plurality of cutting elements and a corresponding quantity of tool holders, one for each cutting element, the cutting elements and tool holders being arranged around a circumferential surface of the cutter body, each cutting element being received into a seat in the tool holder, in which the seat is oriented such that the cutting element points in or towards the intended direction of rotation.

In some embodiments, the tool holders extend radially outwardly from the cutter body.

Preferably, a rake angle of the cutting element with respect to the tool holder is between 10 and 30 degrees. Optionally, the rake angle is around 25 degrees.

The tool holder may be permanently mounted to the cutter body, for example, using brazing. Alternatively, the tool holder may be detachably mounted to the cutter body. In one embodiment, the tool holder is detachably mounted to the cutter body using a locking pin arrangement.

Each cutting element may be permanently secured into place on the seat, for example, using brazing. In one embodiment, the cutting element may be rotatably mounted in the seat.

Optionally, the tool holder is generally frusto-conical when viewed axially, having a shorter leading face than the trailing face, the seat being located in the leading face.

Optionally, the cutting element is cylindrical with a planar cutting surface. The or each cutting element may be a polycrystalline diamond compact (PDC).

In some embodiments, a lateral extent of each cutting element is greater than a lateral extent of the tool holder. In such embodiments, the cutting element optionally laterally overhangs the tool holder by at least 1 mm on either side.

Each tool holder may taper laterally inwardly from the cutting element towards the cutter body.

BRIEF DESCRIPTION OF THE DRAWINGS

The invention will now be more particularly described, by way of example only, with reference to the accompanying drawings, in which.

In the drawings, similar parts have been assigned similar reference numerals.

DETAILED DESCRIPTION

Figure 1:
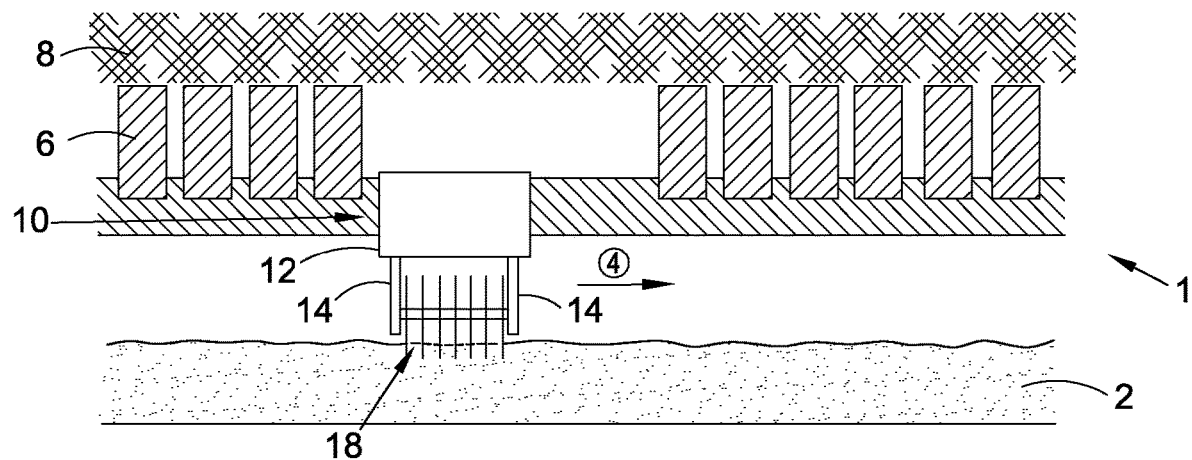
FIG. 1 is a schematic plan view of an underground mine incorporating a first embodiment of a cutting assembly as part of a long wall mining system, and in particular shows the cutting assembly in a horizontal orientation.
Figure 2:
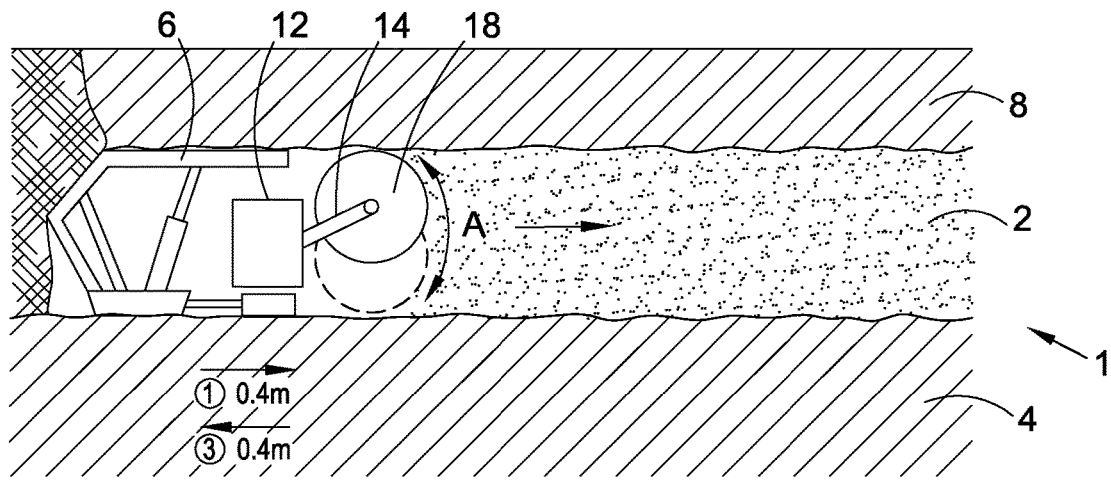
FIG. 2 is a schematic end view of the long wall mining system of FIG. 1.

Referring initially to FIGS. 1 to 2, a cutting assembly for slicing into natural formations 2 underground is indicated generally at 10.

The cutting assembly forms part of a long wall mining system 1, commonly found in underground mines. The cutting assembly is a substitute for known shearer technology, which operates on a mine floor 4, amidst a series of adjustable roof supports 6. As the shearer advances in the direction of mining, the roof supports 6 are positioned to uphold the mine roof 8 directly behind the shearer. Behind the roof supports 6, the mine roof 6 collapses in a relatively controlled manner. Typically, a gathering arm collects mined rock at the cutting face and transfers it onto a conveying system for subsequent removal from the mine.

In a first embodiment, indicated in FIGS. 1 and 2, the cutting assembly 10 comprises a base unit 12, a pair of spaced apart support arms 14 extending from the base unit 12, a drive spindle 16 extending between and rotatably mounted to the pair of moveable support arms 14, and a plurality of disk cutters 18 fixed about the drive spindle 16.

Figure 3:
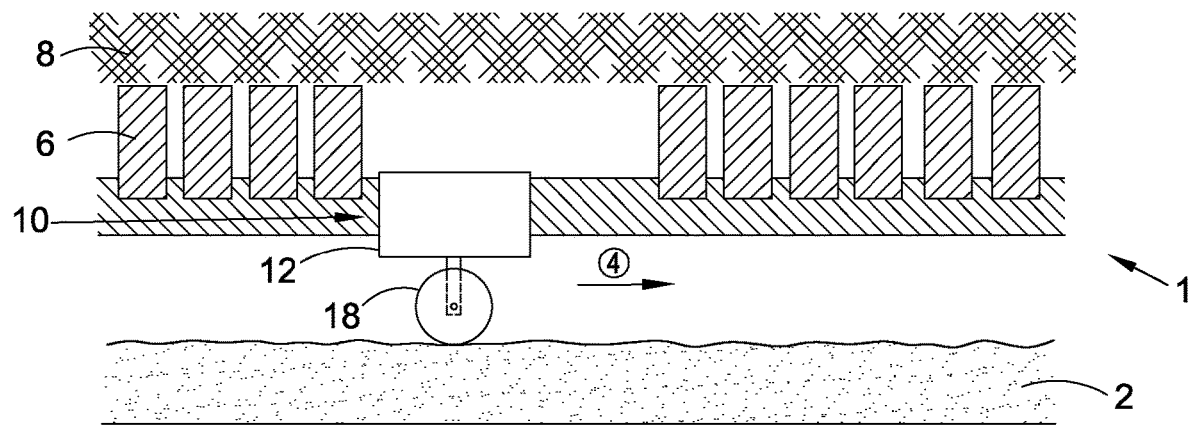
FIG. 3 is a schematic plan view of an underground mine incorporating a second embodiment of a cutting assembly as part of a long wall mining system, and in particular shows the cutting assembly in a vertical orientation.
Figure 4:
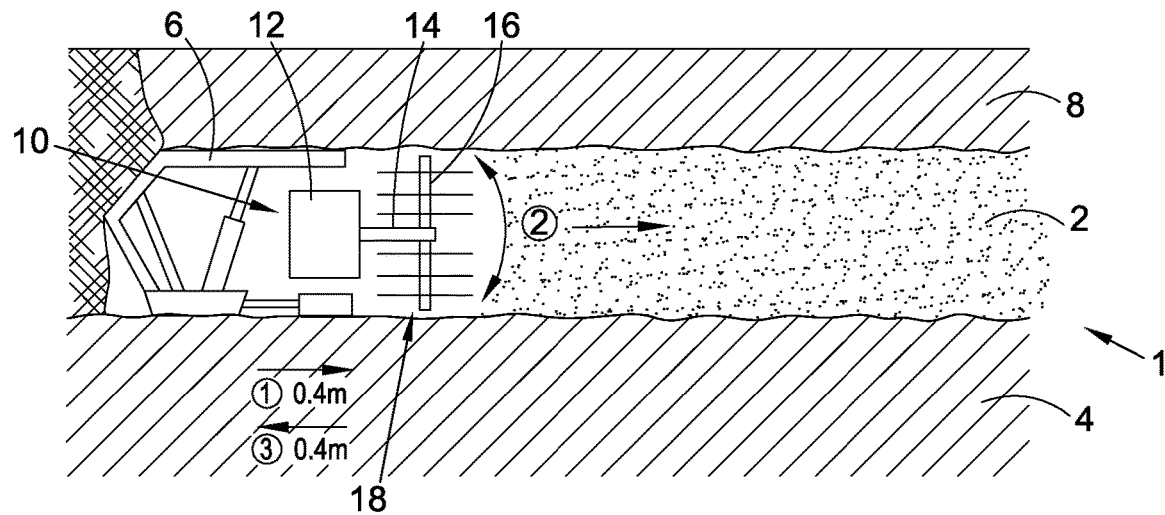
FIG. 4 is schematic end view of the long wall mining system of FIG. 3.

In a second embodiment, indicated in FIGS. 3 and 4, a single support arm 14 extends from the base unit 12. The drive spindle 16 is supported centrally by the single support arm 14, and the plurality of disk cutters 18 is mounted to the drive spindle 16, distributed either side of the single support arm 14.

In an alternative embodiment, not shown, only a single disk cutter 18 is used.

Preferably, the or each disk cutter 18 is mounted at is centre (i.e. centrally) about the drive spindle 16. However, this is not essential, and the or each disk cutter 18 may alternatively be mounted off-set from its centre about the drive spindle 16. Optionally, a combination of the two arrangements could be used instead. For example, when multiple disk cutters 18 are used in a series, i.e. in parallel next to each other along a drive spindle 16, alternating disk cutters 18 may be mounted centrally about the drive spindle 16. Each centre of the remaining disk cutters 18 may be radially off-set from the point at which the disk cutter 18 is mounted about the drive spindle 16. Other combinations are envisaged.

The base unit 12 functions as a transport system for the disk cutter 18. The base unit 12 is moveable to advance and retract the disk cutter 18 into and out of an operational position, in close proximity to the rock formation 2 to be cut. The speed at which the base unit 12 moves closer to the rock formation 2 is one of several variables determining the feed rate of the cutting assembly 10 into the rock formation 2. The base unit 12 (in concert with the roof supports 6) is also moveable sideways, from left to right and vice versa, along the long wall of the rock formation 2 to be mined.

Each support arm 14 is configured to be moveable into a first and a second cutting orientation. In the first cutting orientation, best seen in FIGS. 1 and 2, the drive spindle 16 is horizontal. As a result, cuts in the rock formation 2 made by the disk cutter 18 are correspondingly vertical. In the second cutting orientation, best seen in FIGS. 3 and 4, the drive spindle 16 is vertical. Consequently, cuts in the rock formation 2 made by the disk cutter 18 are correspondingly horizontal. First and second cutting orientations are possible with either first or second embodiments mentioned above.

Optionally, the support arm(s) 14 may also be moveable such that the drive spindle 16 is operable in any cutting orientation between the aforementioned vertical and horizontal, though this is not essential. The support arm(s) 14 may alternatively be configured such that they are moveable between the first and second cutting orientations but only fully operational (i.e. the disk cutter(s) to rotate in order to facilitate cutting or pulverising of the rock) in the first and second cutting orientations.

Each support arm 14 is moveable between a first operative position and a second operative position, in optionally each of the first and second cutting orientations, according to the depth of cut required. This is indicated by double end arrow A in FIG. 2. For example, in the first operative position, the drive spindle 16 is lowered so as to be in close proximity to the mine floor 4 and in the second operative position, the drive spindle 16 is raised so as to be in close proximity to the mine roof 8.

Optionally, each support arm 14 may have a first arm portion connected to a second arm portion by a pivot joint (or alternatively, a universal joint), each first and second arm portion being independently moveable relative to each other. This arrangement augments the degrees of freedom with which the cutting assembly 10 may operate and advantageously improves its manoeuvrability.

The drive spindle 16 is driven by a motor to rotate at a particular speed. The power of the motor is typically between 20 and 50 kW per disk cutter 18, depending on the type of disk cutter 18 selected and the cutting force required.

Figure 5:
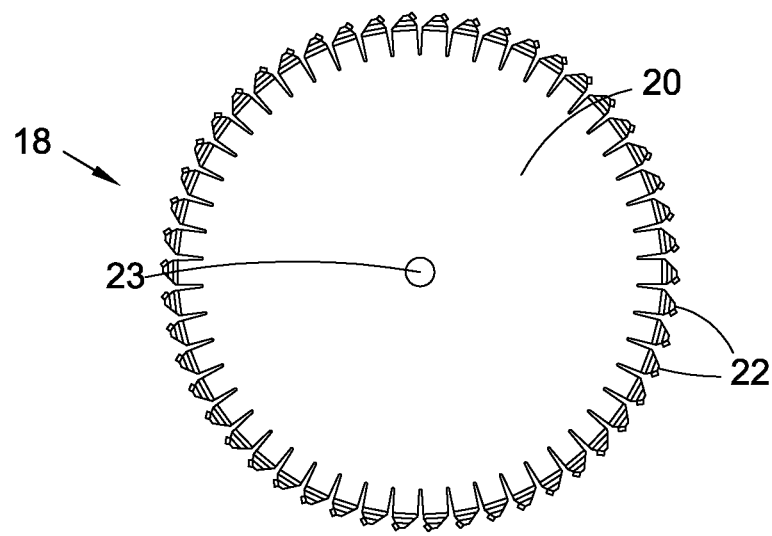
FIG. 5 shows a front elevation view of a first embodiment of a disk cutter.

As best seen in FIG. 5, in one embodiment, the disk cutter 18 comprises a circular body 20 and a plurality of cutting elements 22 arranged peripherally around the circular body 20. Rotation of the drive spindle 16 causes a corresponding rotation of the disk cutter 18. However, the disk cutter 18 need not be circular and may just be generally circular, for example, depending on its size, an octagonal shaped cutter could approximate a generally circular disk cutter. Accordingly, the disk cutter 18 may be hexagonal, octagonal, decagonal etc, or indeed have any number of circumferentially extending sides.

The or each disk cutter 18 may further comprise one or more sensors. These sensors may be embedded or integrated into the cutter body 20. The sensor may be any one of the following: a temperature sensor, a pressure sensor, an X-ray sensor, a gamma ray sensor, an accelerometer, a sensor configured to monitor the chemistry of the cutting conditions, or a sensor to identify the rock formation or materials for extraction. In such an embodiment, the sensors may be coupled to a data harvesting system, and potentially also coupled with a data analysis package on-line or remote from the mining/extraction operation.

In a preferred embodiment, a plurality of disk cutters 18 is arranged on the drive spindle 16. Typically, six or more disk cutters 18 may be provided. The disk cutters 18 are preferably regularly spaced apart along the length of the drive spindle 16, between the pair of spaced apart support arms 14a, 14b, or either side of the support arm 14, depending on the embodiment.

The spacing of the disk cutters 18 is selected according to the depth of cut required and the mechanical properties, e.g. Ultimate Tensile Strength (UTS), of the rock formation 2 being cut in order to optimise the specific cutting energy, which will dictate the required power consumption. The aim is to achieve conditions under which the cut material will breakout under its own weight. For example, for a 0.4 m depth of cut in Kimberlite, the ideal spacing between adjacent disk cutters is around 0.3 m. However, this can be increased or decreased depending on the force required for breakout. Preferably, the spacing is adjustable in-situ and may be an automated process or a manual process. The spacing may be remotely adjustable, for example from an operations office above ground. A wedge shaped tool may be used to apply such a breakout force, to assist in rock breakout.

The disk cutters 18 are spaced apart by a gap measuring between preferably 0.01 m and 2 m, more preferably between 0.01 m and 0.5 m. Yet more preferably, the disk cutters are 18 spaced apart by a gap measuring between 10 cm and 40 cm.

The circular body 20 of the disk cutter 18 is typically made from steel and has a diameter of approximately 1000 mm and a thickness (measured axially, also considered to be a lateral extent for subsequent descriptions) of approximately 11 mm. Realistically, such a diameter enables a depth of cut of up to 400 mm. The circular body 20 has a shaft diameter 23 of between 60 mm and 100 mm, and is sized and shaped to receive the drive spindle 16.

The diameter (or effective diameter in the case of non-circular disk cutters) and thickness of the disk cutter 18 are selected appropriately according to the intended application of the cutting assembly. For example, cable laying applications would require a disk cutter 18 with a smaller diameter. Robotic arm angle grinders would require a yet smaller diameter. Tunnelling applications though would require a disk cutter 18 with a significantly greater diameter and would be adapted accordingly.

In this embodiment, the disk cutter 18 also comprises a plurality of tool holders 24 for receiving a corresponding quantity of cutting elements 22. In an alternative embodiment, the disk cutter comprises one or more tool holders.

Preferably though not essentially, each tool holder 24 provides a seat for one cutting element 22. Preferably, each tool holder 24 is made from steel but may alternatively comprise any metal(s) or carbides or ceramic based materials with a hardness above 70 HV (Vickers Hardness). Each tool holder 24 may be either permanently connected to the cutter body 20 (e.g. using brazing or welding), as in the embodiment shown in FIGS. 5, 6 and 7, or it is detachably mounted to the cutter body 20 using a retention mechanism, as in the embodiment shown in FIGS. 8, 9 and 10a and 10b. A mixture of brazing, welding and/or mechanical connections could be used. Alternatively, the tool holder(s) 24 may be formed integrally with the body 20 of the disk cutter 18, for example, by forging, powder metallurgy etc.

The retention mechanism may comprise a locking pin arrangement 25 which is used to secure the tool holder 24 to the cutter body 20. Clamping, shrink fitting etc may alternatively be used.

In one embodiment, each cutting element 22 is rigidly or fixedly supported by one of the tool holders 24. Each tool holder 24 is preferably equi-angularly spaced around a circumferential surface of the cutter body 20. Each cutting element 22 may be secured in place in or on the tool holder 24 using brazing. Alternatively, the or each tool holder 24 may be configured to rotatably receive a cutting element 22. In such an embodiment, the cutting element 22 and tool holder 24 may be configured such that the cutting element 22 may freely rotate within the tool holder 24, e.g. with a clearance fit, or alternatively be able to rotate within the tool holder 24 only when the cutting element 22 comes into contact with the rock formation being mined/excavated, e.g. with a transition fit.

Each of the cutting elements 22 comprise a hard, wear resistant material with a hardness value of 130 HV and above. The cutting element 22 preferably comprises a superhard material selected from the group consisting of cubic boron nitride, diamond, diamond like material, or combinations thereof, but may be a hard material such as tungsten carbide instead. The cutting element 22 may comprise a cemented carbide substrate to which the superhard material is joined.

In one embodiment, the cutting elements 22 are polycrystalline diamond compacts (PCDs), more commonly found in the field of Oil and Gas drilling. Such PCDs are often cylindrical and usually comprise a diamond layer sinter joined to a steel or carbide substrate.

The PCD has a diameter of between 6 mm and 30 mm, preferably between 8 mm and 25 mm. For example, the PCD may have a diameter of 13 mm, or 16 mm or 19 mm. Preferably, the PCD has a diameter of 16 mm. A combination of diameters may be used in a disk cutter.

Each PCD may be chamfered, double chamfered or multiple chamfered.

Each PCD may comprise a polished cutter surface, or be at least partially polished.

Alternatively, rather than being a traditional PCD, the cutting element 22 may be a 3-D shaped cutter. A strike tip of the cutting element 22 may be conical, pyramidal, ballistic, chisel-shaped or hemi-spherical. The strike tip may be truncated with a planar apex, or non-truncated. The strike tip may be axisymmetric or asymmetric. Any shape of cutting element 22 could be used, in combination with any aspect of this invention. Examples of such shaped cutters can be found in WO2014/049162 and WO2013/092346.

Figure 6:
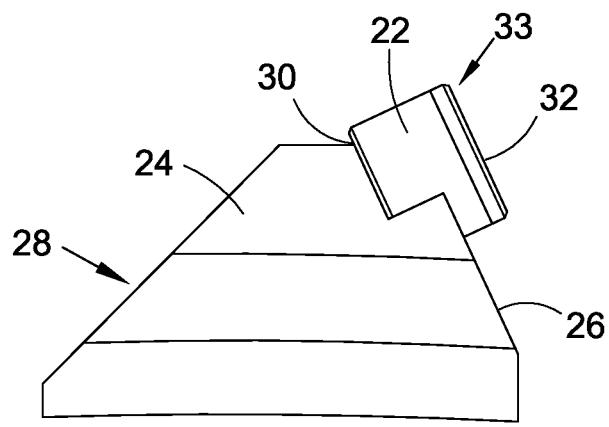
FIG. 6 shows a front elevation view of a cutting element for use with the disk cutter of FIG. 5.
Figure 7:
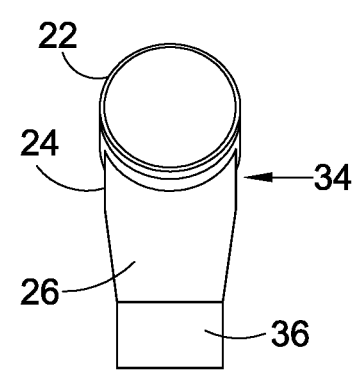
FIG. 7 shows a side elevation view of the cutting element of FIG. 6.

In a first embodiment of a tool holder 24, in FIGS. 5, 6 and 7, each tool holder 24 is generally frusto-conical when viewed axially (see FIG. 6). Each tool holder 24 has a leading face 26 and a trailing face 28, each cutting element 22 being received into a seat 30 in the leading face 26 of the tool holder 24. Each seat 30 is angled such that the cutting element 22 tangentially faces (or generally points towards) the intended direction of rotation. This is particularly useful for PCDs which have a planar primary cutting surface 32. Thanks to the seat, a cutting edge 33 of the cutting element 22 can be oriented in a range of angles with respect to the cutter body 20, which contrasts with the conventional approach of having cutting elements 22 pointing exclusively radially or axially outwards in the direction of advance of the rock face. This allows great flexibility for obtaining a desired cutting angle without having to modify the configuration of the strike tip of the cutting element.

Furthermore, having a seat for receiving a separate cutting element 22 means that advantageously, any surplus PDC stock can be used up and find utility in a new application, thereby reducing the working capital of a company.

Optionally, the rake angle of the cutting element is between 25 degrees and 30 degrees. optionally, the rake angle is around 25 degrees. Optionally, the rake angle may be positive or negative.

The leading face 26 of the tool holder 24 is generally shorter than the trailing face 28, thereby providing significant structural back support for the cutting element 22 during use. The tool holder 24, particularly the rear of the tool holder 24 in the direction of rotation, absorbs a significant proportion of the impact forces during use, and reduces the risk of the cutting element 22 otherwise popping out of the cutter body 20 and being lost.

Preferably, the seat fully supports the rear (i.e. the surface that is generally opposite the cutting surface 32) of the cutting element 22.

In side view (see FIG. 7), each tool holder 24 has a varying lateral cross-section, indicated by arrow B. Each tool holder 24 tapers laterally inwardly from the head 34 of the tool holder 24 near the cutting element 22 to a foot 36, near the circular body 20.

A lateral extent (best seen in FIG. 7) of each cutting element 22 is greater than a lateral extent of the tool holder 24. This overhang protects the tool holder 24 from significant wear during use. Preferably, a thickness (i.e. lateral extent) of the tool holder 24 is around 14 mm. In this embodiment, the cutting element 22 protrudes past the tool holder 24 by approximately 1 mm on either side. This ensures that it is the cutting element 22, and not the tool holder 24 or the cutter body 20, which is subject to the primary wear during use. The overhang prevents the tool holder 24 from rubbing against the rock formation 2. In the event of rubbing, a hard coating or multi-layered approach may be used.

Figure 8:
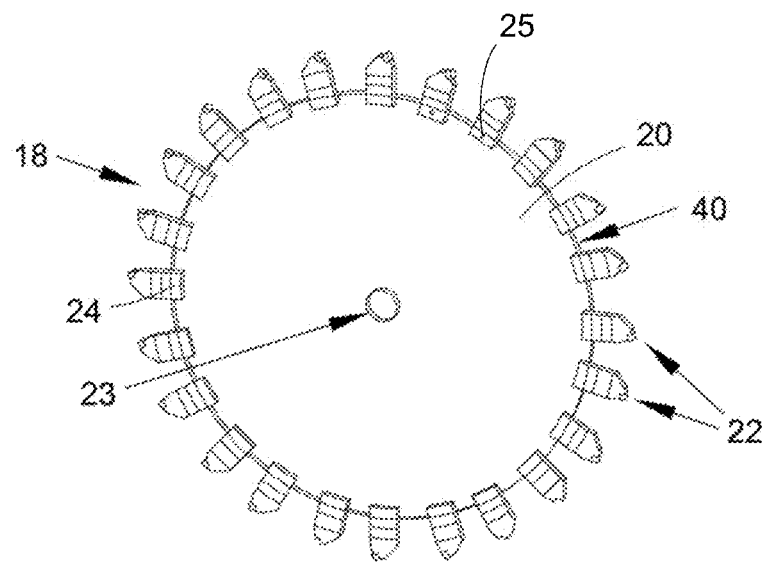
FIG. 8 shows a front perspective view of a second embodiment of the disk cutter.
Figure 9:
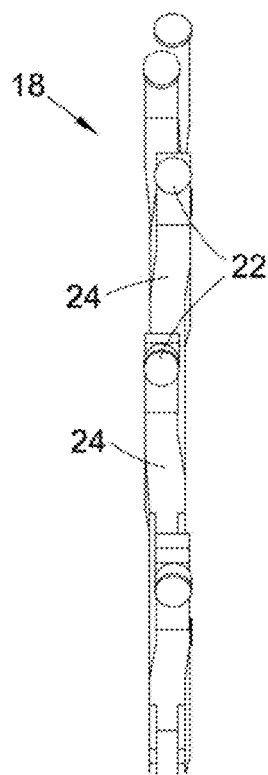
FIG. 9 shows a side elevation view of a plurality of cutting elements for use with the disk cutter of FIG. 8.
Figure 10A:
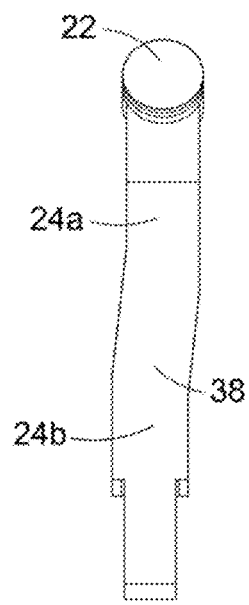
FIG. 10*a* is a side elevation view of a first individual cutting element from FIG. 9.
Figure 10B:
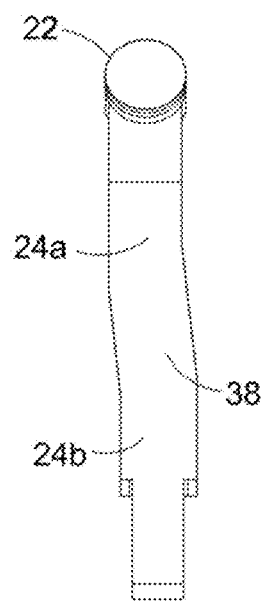
FIG. 10*b* is a side elevation view of a second individual cutting element from FIG. 9.

In a second embodiment of a tool holder 24, as shown in FIGS. 8 and 9, successive tool holders 24 are laterally offset with respect to the cutter body 20. As indicated in FIGS. 10a and 10b, each tool holder 24 includes a slight kink to one side. In other words, a distal portion 24a of the tool holder 24 is laterally offset with respect to the circular body 20 and a proximal portion 24b of the tool holder 24. Both the distal and proximal portions 24a, 24b are laterally elongate. The distal and proximal portions 24a, 24b of the tool holder 24 meet at an intersection, indicated generally at 38. The direction of the lateral offset is in either a first direction, axially away from one side of the cutter body 20, or in a second opposing direction, away from the other side of the cutter body 20. In FIG. 10a, the tool holder 24 kinks rightwards and in FIG. 10b, the tool holder 24 kinks leftwards. The intersection 38 may be a sharp change of direction, such as a dog leg, or a prolonged change of direction, such as a curve. The intersection 38 may comprise a mid-portion joining the distal portion 24a to the proximal portion 24b.

As an alternative, it is envisaged that the proximal portion 24b could be laterally offset with respect to the cutter body 20 whilst the distal portion 24a is in alignment with the circular body 20. However, since the cutting element 22 is usually located on the distal portion 24a of the tool holder 24, the first mentioned arrangement is preferable.

Along the circumferential surface 40 of the cutter body 20, the direction of the lateral offset alternates for successive tool holders 24. The benefit of this arrangement is that it increases the effective cutting area offered by the cutting elements 22 during rotation of the circular body 20, regardless of the size of the cutting element 22. It also facilitates a quick and easy change of an individual tool holder 24 during maintenance and repair, without having to remove the entire cutter body 20. Furthermore, the arrangement helps reduce erosion of the cutter body 20 (sometimes known as 'body wash') caused by the flow of cut rock past the cutting assembly 10.

The cutting assembly 10 may additionally comprise a hard-facing material (not shown). The hard-facing material may comprise a low melting point carbide (LMC) material, characterised by its iron base. Exemplary materials are described in U.S. Pat. Nos. 8,968,834, 8,846,207 and 8,753,755, although other wear resistant materials could be used instead. The purpose of the hard facing material is to limit body wash of the circular body 20. The hard-facing material may be located rotationally behind the tool holder 24, proximate to the trailing face 28. If the tool holders 24 are spaced apart, then the hard-facing material may be provided in or on the cutter body 20, between successive tool holders 24. Additionally, or alternatively, the hard-facing material may be provided on the trailing face 28. Additionally, or alternatively, the hard-facing material may be provided on the leading face 26. The hard-facing material may be provided on the leading face 26, the trailing face 28 and on the circumferential surface 40. The location of the hard-facing material on the cutter body 20 and/or tool holder 24 is site specific, and is selected according to the nature of the rock formation being mined at that site.

In use, the disk cutter 18 is brought into contact with the rock formation 2 and rotation of the drive spindle 16, and therefore its disk cutter(s) 18, causes slicing of the rock formation 2. The cutting assembly 10 slices into the rock formation 2, for example, to create clean orthogonal cuts of around 16 mm, depending on the size of the cutting elements 22 selected. The cut rock breakouts either under its own weight or with secondary wedge force, e.g. using a wedge-shaped tool.

Although several applications of the cutting assembly have been mentioned above, tunnelling is a particularly attractive application. Conventionally, in order to create a new tunnel underground, a tunnel boring machine (TBM) is used. TBMs create a cylindrical shaped tunnel in a well-known manner. If the purpose of the tunnel is for vehicular or pedestrianised traffic, and only a circular lateral cross-section is possible, a new horizontal floor must be included within the lower portion of the tunnel. Effectively, the diameter of the tunnel is oversized. Excess rock material must be extracted in order to create the actual required useable space within the upper portion of the tunnel and this increases tunnelling costs, not only because a larger TBM demands more consumable cutting tips than s smaller TBM, but also that the tunnelling operation takes significantly longer. Furthermore, additional material is required for construction of the new floor. Thanks to the cutting assembly described herein, a tunnel with a smaller lateral cross-section can be created, thereby producing the required shape of the upper tunnel. The cutting assembly then follows the smaller TBM to shape the lower half of the tunnel, creating a floor perpendicular to the walls, and removing significantly less material than with a larger TBM.

While this invention has been particularly shown and described with reference to embodiments, it will be understood by those skilled in the art that various changes in form and detail may be made without departing from the scope of the invention as defined by the appended claims.

For example, in the second embodiment of the cutting assembly, though only a single support arm 14 has been described, two or more spaced apart supports arms 14 may be provided instead.

For example, the two embodiments described herein both include a plurality of disk cutters 18 mounted on the drive spindle 16. This need not be the case and a single disk cutter 18 could be used instead.

For example, instead of using a combination of paired cutting elements 22 and tool holders 24, the cutting elements may be integrated directly into the body of the disk cutter 18 at a peripheral edge thereof, thereby obviating the need for an intermediate tool holder 24.

For example, the or each cutting element may comprise single crystal diamond instead of polycrystalline diamond material.

For example, the cutting element 22 may comprise diamond or abrasive grit impregnated metal or be ceramic based.

Although, the cutting assembly 10 has been described as been of being utility underground, it may equally be used above ground, for example in an open quarry.

Furthermore, a smaller scale version could be used for digging micro trenches in roads and pavements, for example, for laying small diameter fibre optic cables. In this case, the cutting assembly 10 would be cutting into asphalt and concrete, not rock. In such an embodiment, the diameter of the cutter body 20 would be in the order of 300 mm, the lateral thickness of the cutter body up to 20 mm, and the cutting elements sized correspondingly. The intention is to achieve a depth of cut of around 50 mm to 100 mm.

Certain standard terms and concepts as used herein are briefly explained below.

As used herein, polycrystalline diamond (PCD) material comprises a plurality of diamond grains, a substantial number of which are directly inter-bonded with each other and in which the content of the diamond is at least about 80 volume percent of the material. Interstices between the diamond grains may be substantially empty or they may be at least partly filled with a bulk filler material or they may be substantially empty. The bulk filler material may comprise sinter promotion material.

PCBN material comprises grains of cubic boron nitride (cBN) dispersed within a matrix comprising metal, semi-metal and or ceramic material. For example, PCBN material may comprise at least about 30 volume percent cBN grains dispersed in a binder matrix material comprising a Ti-containing compound, such as titanium carbonitride and or an Al-containing compound, such as aluminium nitride, and or compounds containing metal such as Co and or W. Some versions (or "grades") of PCBN material may comprise at least about 80 volume percent or even at least about 85 volume percent cBN grains.

The invention claimed is:

1. A cutting assembly for a rock excavation machine comprising:
   a base unit,
   one or more moveable support arms extending from the base unit,
   a drive spindle rotatably mounted to the or each moveable support arm,
   a disk cutter fixed about the drive spindle such that rotation of the drive spindle causes a corresponding rotation of the disk cutter,
   the disk cutter comprising a cutter body, a plurality of cutting elements and a corresponding quantity of tool holders that are separate from the cutter body, one for each cutting element, the cutting elements and tool holders being arranged around a circumferential surface of the cutter body,
   each cutting element being received into a seat in the tool holder,
   in which the seat is oriented such that the cutting element points in or towards the intended direction of rotation, and
   in which the cutting element is cylindrical with a planar cutting surface, the or each cutting element being a polycrystalline diamond compact (PDC), a lateral extent of each cutting element being greater than a lateral extent of the corresponding tool holder.

2. The cutting assembly as claimed in claim 1, in which the tool holders extend radially outwardly from the cutter body.

3. The cutting assembly as claimed in claim 1, in which a rake angle of the cutting element with respect to the tool holder is between 10 and 30 degrees.

4. The cutting assembly as claimed in claim 3, in which the rake angle is around 25 degrees.

5. The cutting assembly as claimed in claim 1, in which the tool holder is permanently mounted to the cutter body.

6. The cutting assembly as claimed in claim 1, in which the tool holder is detachably mounted to the cutter body.

7. The cutting assembly as claimed in claim 6, in which the tool holder is detachably mounted to the cutter body using a locking pin arrangement.

8. The cutting assembly as claimed in claim 1, in which each cutting element is permanently secured into place on the seat.

9. The cutting assembly as claimed in claim 1, in which the tool holder is generally frusto-conical when viewed axially, having a shorter leading face than the trailing face, the seat being located in the leading face.

10. The cutting assembly as claimed in claim 1, in which the cutting element laterally overhangs the tool holder by at least 1 mm on either side.

11. The cutting assembly as claimed in claim 1, in which each tool holder tapers laterally inwardly from the cutting element towards the cutter body.

* * * * *